(12) United States Patent
Chen et al.

(10) Patent No.: US 6,918,703 B2
(45) Date of Patent: Jul. 19, 2005

(54) SYSTEM FOR TERMINATING OPTICAL FIBERS IN A FIBER OPTIC CONNECTOR

(75) Inventors: Wenzong Chen, Naperville, IL (US); Igor Grois, Northbrook, IL (US); Scot A. Ernst, Plainfield, IL (US); Thomas R. Marrapode, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 254 days.

(21) Appl. No.: 10/167,830

(22) Filed: Jun. 12, 2002

(65) Prior Publication Data

US 2003/0231839 A1 Dec. 18, 2003

(51) Int. Cl.[7] ................................................ G02B 6/36
(52) U.S. Cl. ............................. 385/78; 385/77; 385/76; 385/53
(58) Field of Search ............................... 385/53, 76–78, 385/81

(56) References Cited

U.S. PATENT DOCUMENTS

| | | | |
|---|---|---|---|
| 3,912,574 A | 10/1975 | Cherin et al. ................. 156/502 |
| 4,146,301 A | 3/1979 | Cherin et al. ............. 350/96.21 |
| 4,634,216 A | 1/1987 | Calevo et al. ............ 350/96.21 |
| 4,877,303 A | 10/1989 | Caldwell et al. .......... 350/96.21 |
| 4,964,688 A | 10/1990 | Caldwell et al. ............ 350/96.2 |
| 4,986,626 A | 1/1991 | Bossard ...................... 350/96.2 |
| 5,052,775 A | 10/1991 | Bossard et al. ................ 385/76 |
| 5,121,456 A | 6/1992 | Essert et al. ................... 385/70 |
| 5,134,678 A | 7/1992 | Essert ............................ 385/86 |
| 5,263,105 A | 11/1993 | Johnson et al. ................ 385/72 |
| 5,367,594 A | 11/1994 | Essert et al. ................... 385/70 |
| 5,392,373 A | 2/1995 | Essert ............................ 385/92 |
| 5,440,657 A | 8/1995 | Essert ............................ 385/71 |
| 5,450,517 A | 9/1995 | Essert .......................... 385/135 |
| 5,719,977 A * | 2/1998 | Lampert et al. ............... 385/60 |
| 5,909,526 A * | 6/1999 | Roth et al. ..................... 385/78 |
| 5,993,070 A | 11/1999 | Tamekuni et al. ............. 385/65 |
| 6,173,097 B1 | 1/2001 | Throckmorton et al. ....... 385/59 |
| 6,179,482 B1 | 1/2001 | Takizawa et al. .............. 385/81 |
| 6,186,672 B1 | 2/2001 | Takizawa et al. .............. 385/85 |
| 6,193,421 B1 | 2/2001 | Tamekuni et al. ............. 385/65 |
| 6,238,104 B1 * | 5/2001 | Yamakawa et al. ........... 385/87 |
| 6,247,850 B1 | 6/2001 | Edwards et al. ............... 385/56 |
| 6,623,172 B1 * | 9/2003 | de Jong et al. ................ 385/59 |
| 2001/0002220 A1 * | 5/2001 | Throckmorton et al. ....... 385/66 |
| 2002/0048435 A1 * | 4/2002 | Scanzillo ....................... 385/81 |

* cited by examiner

*Primary Examiner*—Daniel Stcyr
*Assistant Examiner*—April Taylor
(74) *Attorney, Agent, or Firm*—Romi N. Bose

(57) ABSTRACT

A fiber optic connector assembly includes an outer housing having an interior cavity. A termination module is insertable into the cavity and includes a ferrule for terminating a distal end of at least one optical fiber stub. A base is attached to the ferrule and includes a channel for splicing a proximal end of the optical fiber stub to a fiber end of a fiber optic cable. A cover is positionable onto the base for holding the fiber stub and fiber end in the channel. A clamp is provided for holding the cover onto the base. A latch is provided between the clamp and the outer housing for holding the termination module in the cavity of the housing.

14 Claims, 7 Drawing Sheets

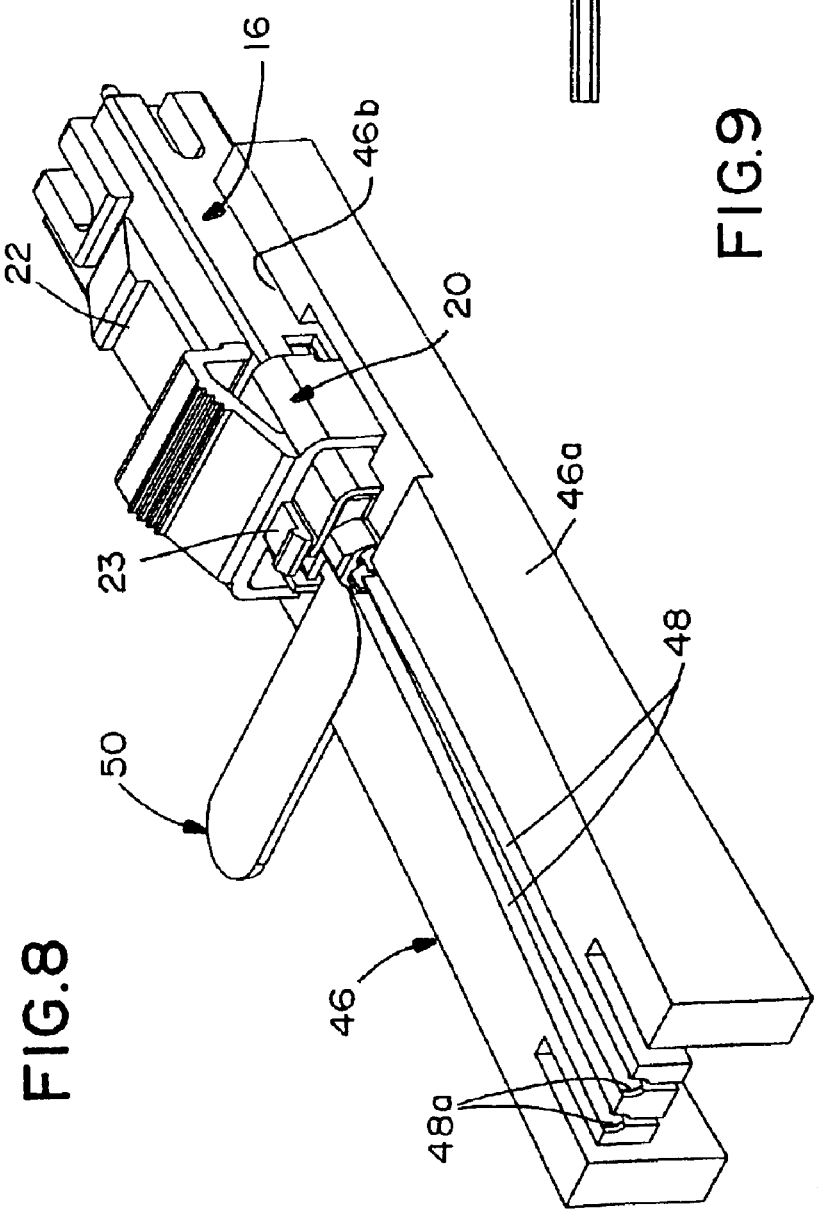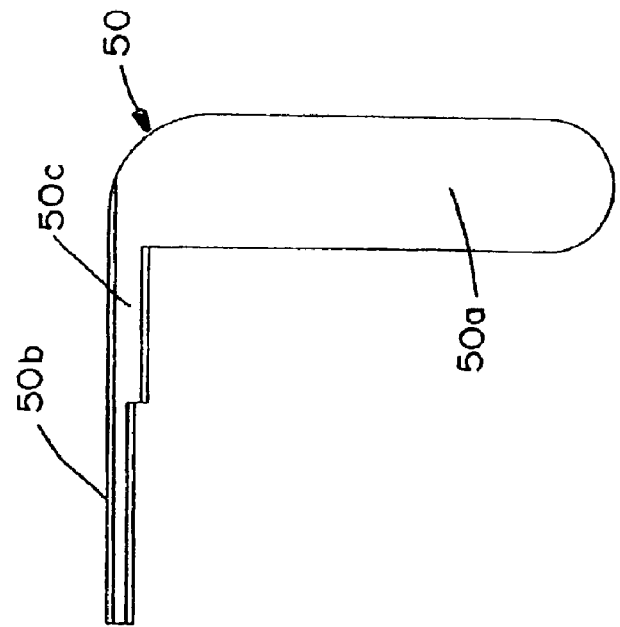

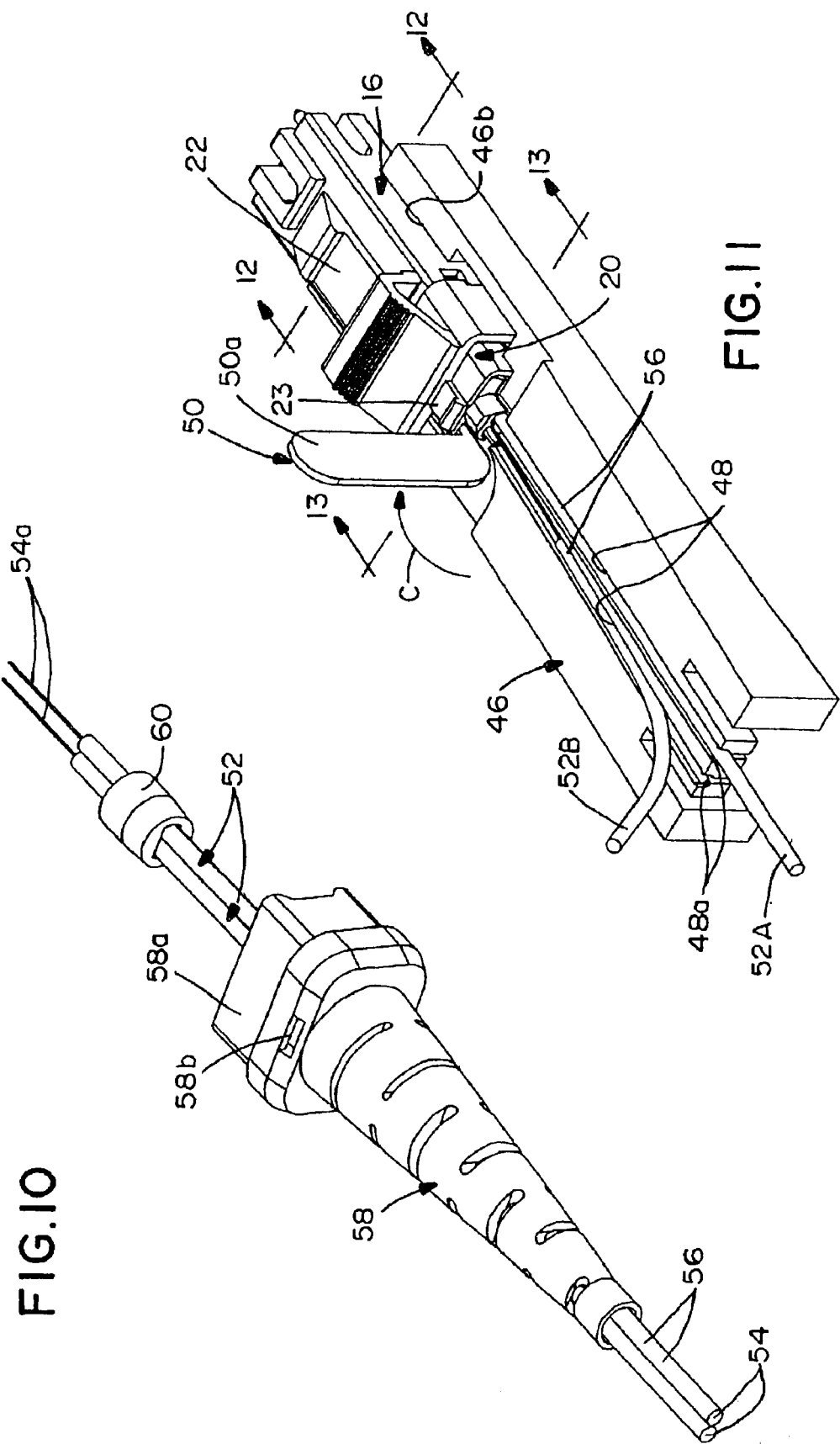

SYSTEM FOR TERMINATING OPTICAL FIBERS IN A FIBER OPTIC CONNECTOR

FIELD OF THE INVENTION

This invention generally relates to the art of fiber optic connector assemblies, and including a system for terminating a plurality of fiber ends in a fiber optic connector.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector assembly includes a ferrule which mounts and centers an optical fiber or positions multiple fibers within the connector. The ferrule may be fabricated of such materials as ceramic or plastic. A ferrule holder of the connector embraces the ferrule and may be fabricated of such material as molded plastic. If the ferrule holder is not part of the connector housing, an outer housing may be provided about the ferrule holder for mating with a complementary connector or other mating connecting device.

A pair of fiber optic connectors or a connector and another optical fiber transmission device may be mated in an adapter which aligns the fibers to provide low insertion losses. The adapter couples the connectors together so that their housed fibers connect end-to-end. The adapter may be an in-line component, or the adapter can be designed for mounting in an opening in a panel, backplane, circuit board or the like.

Fiber optic connectors often are assembled at a factory where bare fiber ends of a fiber optic connector are terminated in the ferrule of the connector assembly. The fiber ends typically are permanently epoxied within passages in the ferrule. The end faces of the fiber ends are highly polished flush with the mating face of the ferrule. However, in many applications, it is desirable to terminate the fiber ends in the field where the elaborate termination and assembly equipment, fixtures and the like typically used in a factory are not available. In field termination, "fiber stubs" have been used to facilitate termination. In other words, a subassembly comprising a ferrule and some sort of fiber alignment component is terminated to one or more short pieces ("stubs") of optical fibers at the factory. The fiber stubs are adhered within the ferrule and the end faces thereof are polished flush with the mating face of the ferrule, as is done with conventional or completed fiber optic connectors. This subassembly then is used in the field to terminate optical fibers to the factory terminated fiber stubs. The present invention is directed to improvements in such field termination systems and connectors.

SUMMARY OF THE INVENTION

An object, therefore, of the invention is to provide a new and improved fiber optic connector assembly particularly applicable for field termination.

Another object of the invention is to provide a new and improved system for field termination of a plurality of fiber ends of a fiber optic cable.

In the exemplary embodiment of the invention, a fiber optic connector assembly includes an outer housing having an interior cavity. A termination module is insertable into the cavity of the outer housing and includes a ferrule for terminating a distal end of at least one optical fiber stub. A base is attached to the ferrule and includes a channel for splicing a proximal end of the optical fiber stub to a fiber end of a fiber optic cable. A cover is positionable onto the base for holding the fiber stub and fiber end in the channel. A clamp holds the cover onto the base. Complementary interengaging latch means are provided between the clamp and the outer housing for holding the termination module in the cavity in the housing.

As disclosed herein, the outer housing is open-ended with an open front mating end at which a mating face of the ferrule is exposed and an open rear end through which the fiber end of the fiber optic cable is positioned into the termination module. A boot surrounds the fiber optic cable extending rearwardly of the housing. Complementary interengaging second latch means are provided between the boot and the housing to hold the boot on the housing.

According to one aspect of the invention, the clamp which holds the cover onto the base of the termination module is a spring metal sleeve embracing the base and the cover. The latch means between the clamp and the outer housing include a latch arm on the metal sleeve engageable with a latch shoulder on the housing.

According to another aspect of the invention, the channel in the base of the termination module includes a narrow forward portion for receiving the proximal end of the optical fiber stub and the fiber end of the fiber optic cable. A wider rearward portion of the channel receives a buffered section of the fiber end of the fiber optic cable. The cover includes a fiber cover part for covering a splicing area of the optical fiber stub and the fiber end of the fiber optic cable. A separate buffer cover part covers the buffered section of the fiber end of the fiber optic cable. The clamp comprises a spring metal sleeve embracing both the fiber cover part and the buffer cover part.

The invention also contemplates a system for terminating a plurality of fiber ends of a fiber optic cable in the connector assembly described above. Specifically, a termination fixture includes a body having a receptacle for positioning and holding the termination module. The body has a plurality of buffer channels in registry with the channels in the base of the termination module, for receiving buffered sections of the plurality of fiber ends of the fiber optic cable. Each buffer channel includes retaining means for holding the respective buffered section in the buffer channel. As disclosed herein, the retaining means is provided by a reduced dimensional cross-sectional section of the respective buffer channel for retaining the respective buffered section by a press-fit.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 8 is a rear perspective view of the outer housing and termination module positioned in the fixture of FIG. 7;

FIG. 9 is a plan view of the key used in field terminating the connector assembly;

FIG. 10 is a perspective view of the subassembly of the boot, fiber cables and tube member of the connector assembly;

FIG. 11 is a view similar to that of FIG. 8, showing a pair of buffered fibers being terminated;

DETAILED DESCRIPTION OF THE PREFERRED EMBODIMENT

Figure 1:
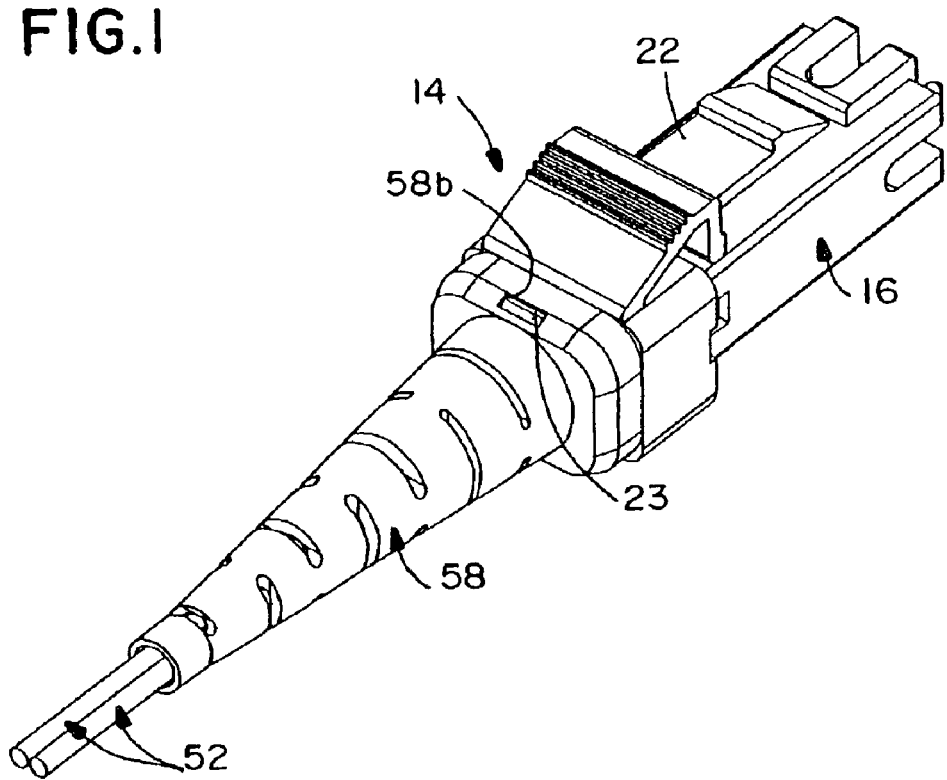
FIG. 1 is a rear perspective view of a fiber optic connector assembly according to the invention.
Figure 2:
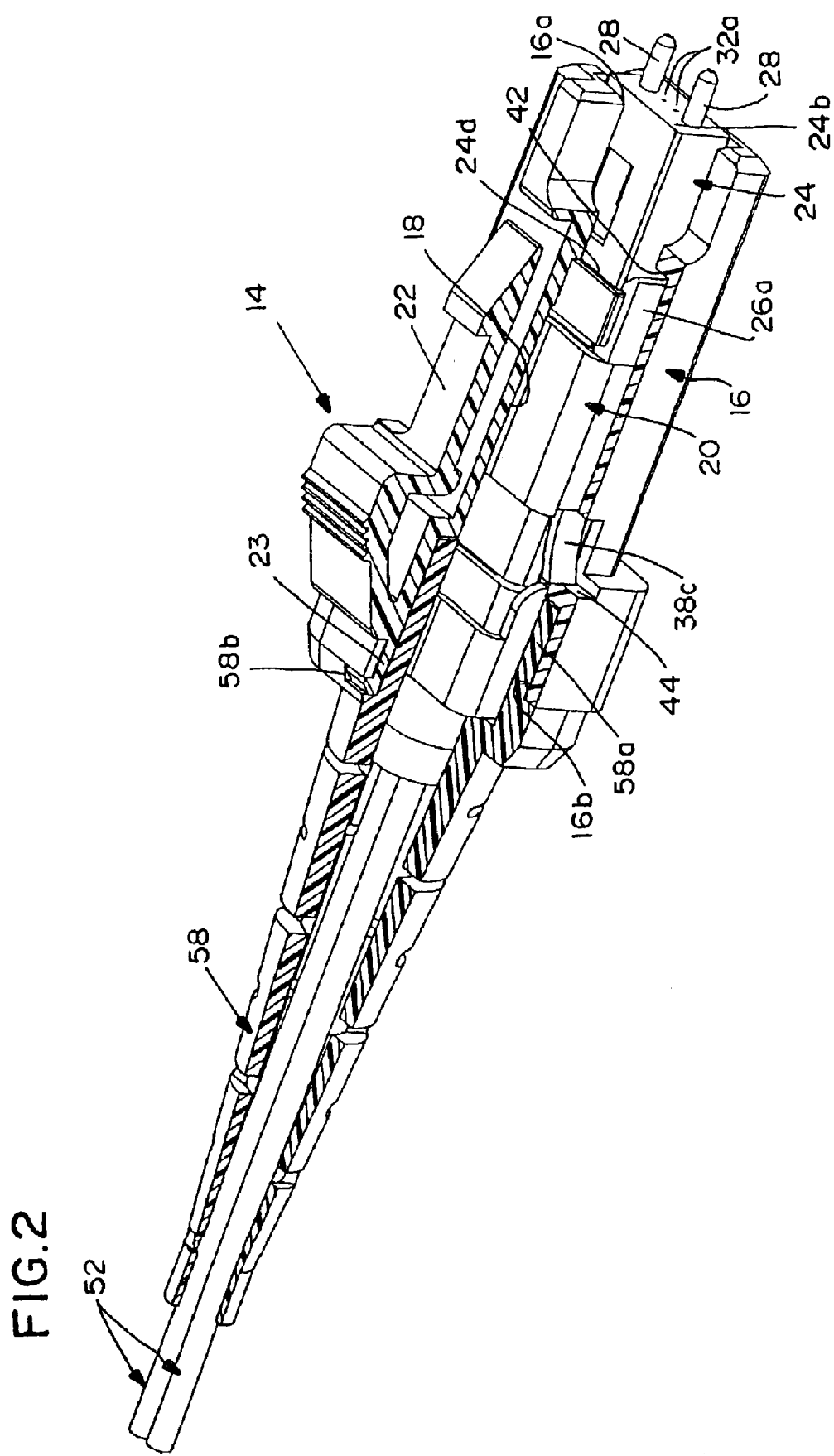
FIG. 2 is a front perspective view of the connector assembly, cut-away and in section axially or longitudinally thereof.

Referring to the drawings in greater detail, and first to FIGS. 1 and 2, the invention is incorporated in a fiber optic connector assembly, generally designated 14, which includes an outer housing, generally designated 16, having an interior cavity 18 (FIG. 2) within which a termination module, generally designated 20, is inserted from the rear of the housing. The housing is open-ended to define an open front end 16a and an open rear end 16b. The housing may be molded of dielectric material such as plastic or the like and includes a flexible latch arm 22 on the exterior thereof for latching the connector assembly in mating condition within an adapter, for instance, or mating the assembly to a complementary mating connector or other connecting device. A pair of rear latch arms 23 project rearwardly of the housing.

Figure 3:
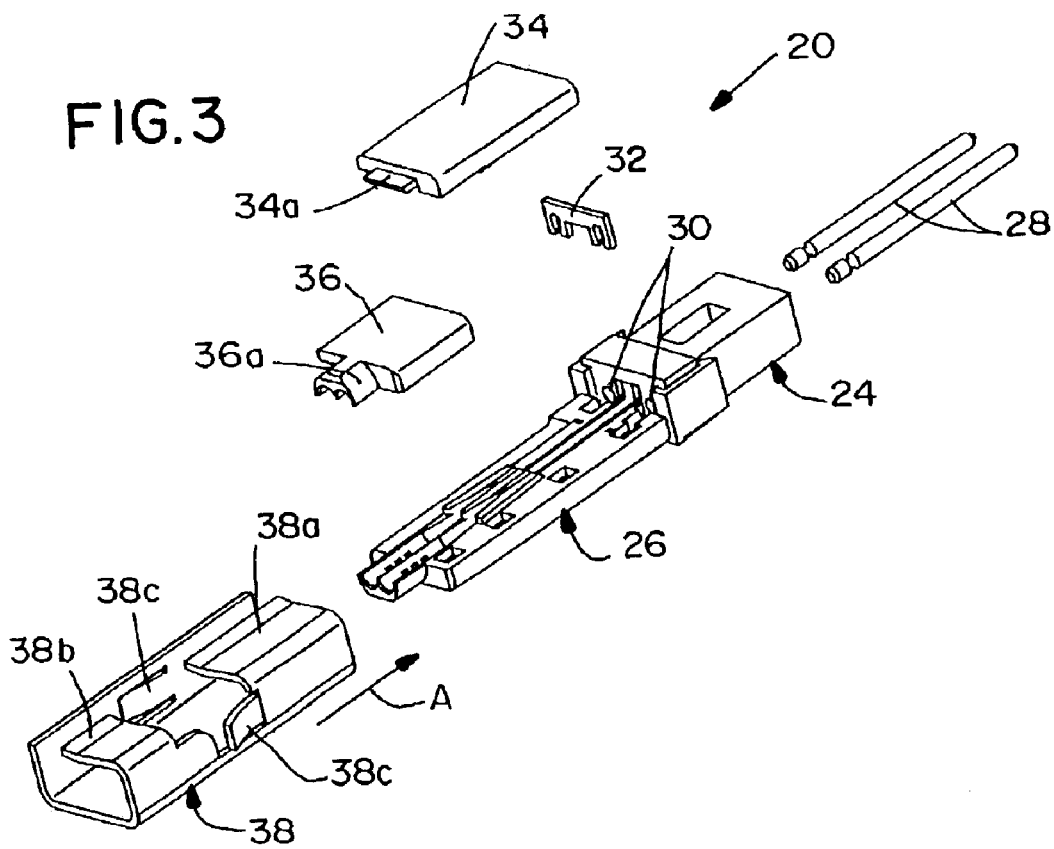
FIG. 3 is an exploded perspective view of the termination module of the assembly.

FIG. 3 shows the components of termination module 20 (FIG. 2) which is disposed within interior cavity 18 of outer housing 16. In particular, termination module 20 includes a ferrule, generally designated 24, and a base, generally designated 26, attached to the ferrule and projecting rearwardly thereof. A pair of alignment pins 28 extend through a pair of passages 30 in the ferule and are secured therein by a retainer clip 32. Termination module 20 further includes a fiber cover 34 and a buffer cover 36 positionable on top of base 26 and held thereon by a clamp in the form of a one-piece spring metal sleeve, generally designated 38.

Figure 4:
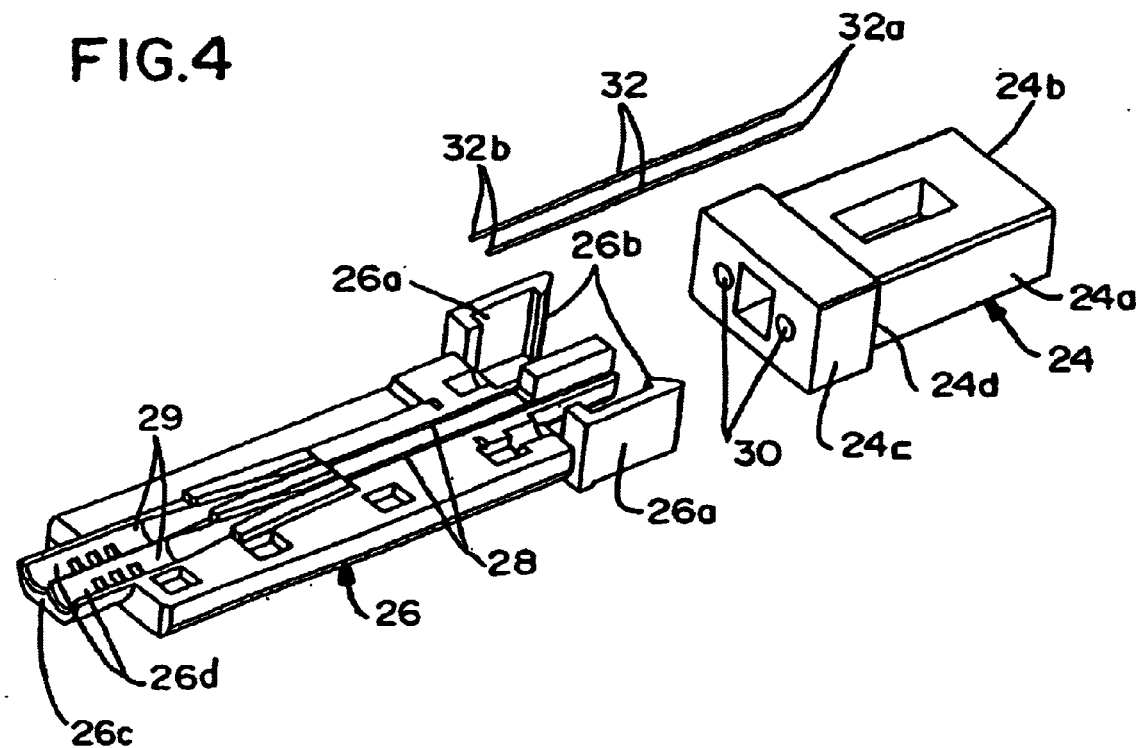
FIG. 4 is a perspective view of the ferrule and base components of the termination module, along with a pair of fiber stubs.
Figure 5:
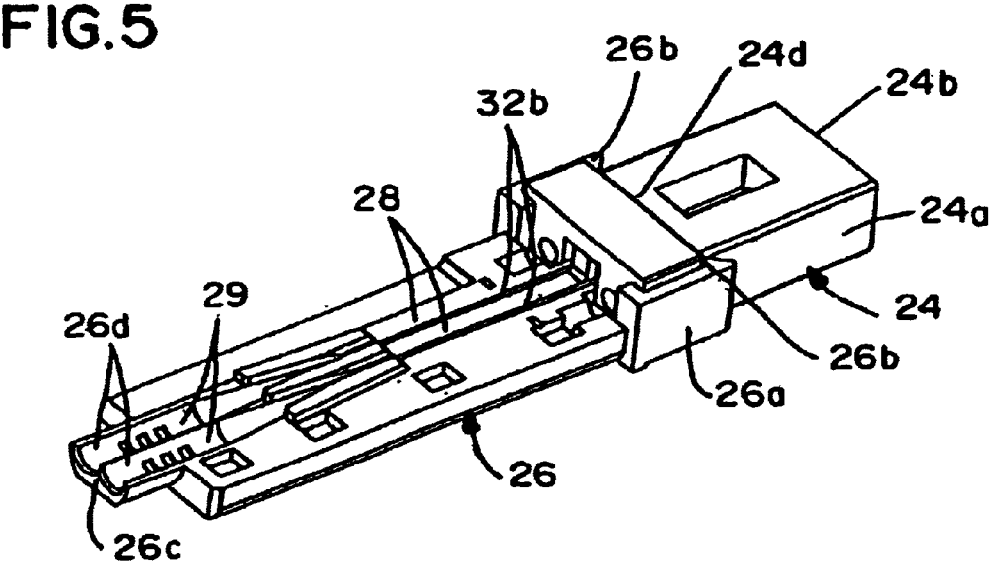
FIG. 5 is a view similar to that of FIG. 4, with the fiber stubs terminated within the ferrule.

Referring to FIGS. 4 and 5 in conjunction with FIG. 3, it can be seen that ferrule 24 includes a forward body portion 24a defining a front mating face 24b and a rear flange 24c. The rear flange forms a forwardly facing shoulder 24d. The ferrule may be fabricated of a plastic material.

Still referring to FIGS. 4 and 5 in conjunction with FIG. 3, base 26 includes a pair of forwardly projecting latch arms 26a having latch hooks 26b at the forward ends thereof for latching engagement behind shoulder 24d of ferrule 24 as seen in FIG. 5. The base may be molded of plastic material or the like. A cable retention boss 26c projects rearwardly from base 26 and is formed with a pair of troughs 26d in the top surface thereof. Base 26 includes a pair of forward fiber channels 28 in communication with a pair of rear buffer channels 29, the buffer channels being in communication with troughs 26d.

Figure 6:
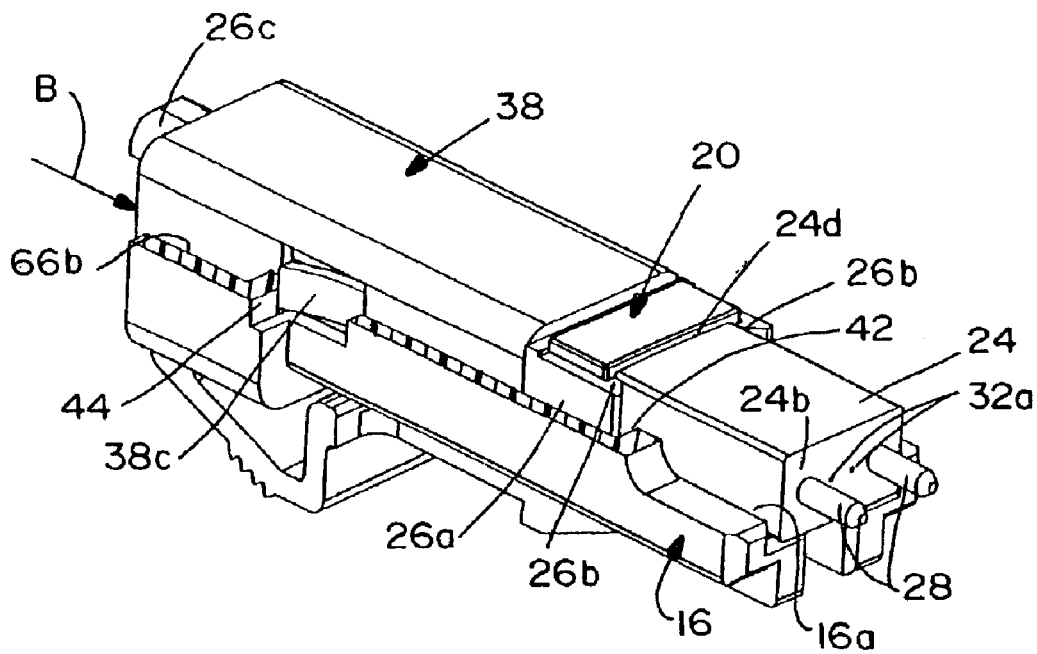
FIG. 6 is a front perspective view of the termination module, with an axial section through the outer housing.

As seen in FIG. 4, a pair of fiber stubs 32 include forward distal ends 32a and rear proximal ends 32b. These fiber stubs are permanently adhered, as by epoxy, within a pair of passages in ferrule 24 such that distal ends 32a of the fiber stubs are flush with front mating face 24b of ferrule 24 as seen in FIG. 6, with proximal ends 32b of the fiber stubs projecting rearwardly of the ferrule as seen in FIG. 5. It can be seen that the rear proximal ends of the fiber stubs are disposed in fiber channels 28 of base 26.

After fiber stubs 32 are secured within ferrule 24 and fiber channels 28 of base 26, fiber cover 34 and buffer cover 36 (best shown in FIG. 3) are positioned on top of the base. The fiber cover has a rearwardly projecting tab 34a which projects into a recess (not visible in the drawings) in the front of buffer cover 36 to join the covers in conjoint alignment. The buffer cover has a rearwardly projecting cable retention boss 36a with troughs 36b on the underside thereof for registry with troughs 26d of base 26. Spring sleeve 38 then is positioned over base 26 and covers 34 and 36 in the direction of arrow "A" (FIG. 3) to hold the covers onto the base. FIG. 3 best shows that the metal spring sleeve has a forward clamping portion 38a for engaging the top of fiber cover 34 and a rear clamping portion 38b for engaging the top of buffer cover 36. A pair of resilient latch arms 38c are formed integrally with the metal spring sleeve and project outwardly from opposite sides thereof.

After termination module 20 (FIG. 3) is assembled as described above, the module is inserted through open rear end 16b of outer housing 16 in the direction of arrow "B" (FIG. 6) until the front hooked ends 26b of latch arms 26a of base 26 engage interior shoulders 42 within the housing as seen in FIG. 6. In this position, resilient latch arms 38c of metal spring sleeve 38 snap outwardly behind a pair of latch shoulders 44 of the housing. The termination module now is secured within the housing, with front mating face 24b of ferrule 24 projecting outwardly beyond or at least exposed at front open end 16a of the housing as clearly seen in FIG. 6. This entire assembly of termination module 20 and outer housing 16, along with fiber stubs 32, can be fabricated or assembled at the factory and then readily used in the field for field termination of a pair of fiber optic cables.

At this point, it should be understood that the use of the term fiber optic "cable" is used herein and in the claims hereof as incorporating a single buffered optical fiber as well as a plurality of buffered fibers or a plurality of fibers within an outer jacket or cladding of a multi-fiber cable. A buffered fiber is formed by a bare optical fiber surrounded by a dielectric or "buffer".

Figure 7:
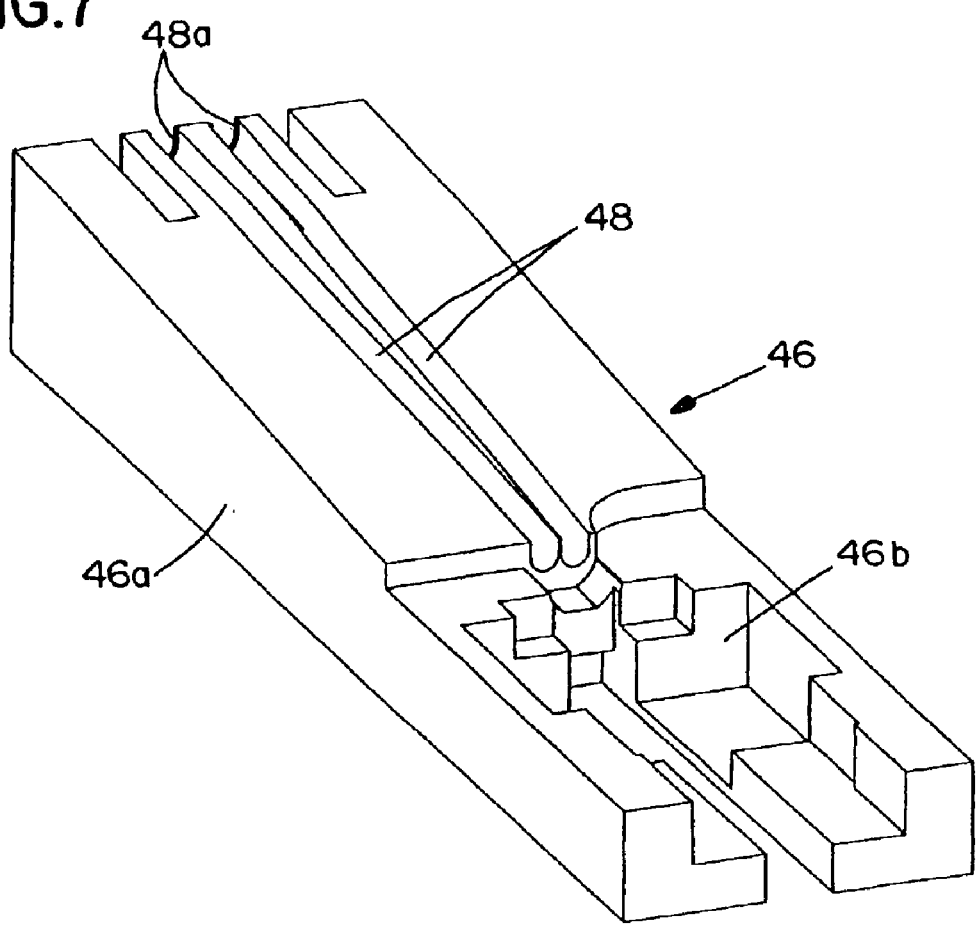
FIG. 7 is a perspective view of the fixture used in field terminating the connector assembly.

With that understanding, FIGS. 7–9 show certain appliances for use in field termination of connector assembly 14 (FIGS. 1 and 2) by using the factory fabricated subassembly of termination module 20 and outer housing 16 as seen in FIG. 6. More particularly, FIGS. 7 and 8 show a disposable termination fixture, generally designated 46, which includes a body 46a defining a receptacle 46b shaped and contoured for positioning and holding termination module 20 within outer housing 16 as seen in FIG. 8. The body has a pair of buffer channels 48 in the top surface thereof. When the termination module and outer housing are positioned in the fixture as seen in FIG. 8, buffer channels 48 are in alignment with buffer channels 29 (FIGS. 4 and 5) in base 26 of the termination module. Finally, FIGS. 7 and 8 show that the rear mouths of buffer channels 48 have cable retaining means in the form of inwardly projecting ribs 48a which define reduced-dimensional cross-sectional sections of the buffer channels for retaining respective buffered sections of a pair of fiber optic cables, as will be seen hereinafter.

FIG. 8 shows a disposable key, generally designated 50, used in the system of the invention, as will be seen hereinafter. As shown in FIG. 9, the key has a handle portion 50a which is integral with a two-part probe including a forward, smaller probe portion 50b and a rear larger probe portion 50c. The key is used to spread fiber cover 24 and buffer cover 36 away from base 26, as will be seen hereinafter.

FIG. 10 shows a pair of fiber optic cables, generally designated 52, each of which includes an inner fiber 54 surrounded by an outer dielectric or buffer 56. It can be seen in FIG. 10 that the cables have been prepared by removing buffers 56 to expose bare fibers ends 54a at the ends of the cables. Again, it should be understood that the term "cable" is intended to mean an individual buffered fiber as well as a plurality of buffered fibers surrounded by an outer jacket or cladding.

Before or after cables 52 are prepared by removing buffers 56 to expose fiber ends 54a, the cables are threaded forwardly through a boot, generally designated 58, and a retention tube, generally designated 60. The boot has a forward section 58a and a pair of latch openings 58b. The assembly of the boot and retention tube will be described hereinafter.

FIG. 11 shows a pair of cables 52A and 52B being assembled within termination module 20 as the termination module and outer housing 16 are held within termination fixture 46. As will be seen in relation to FIGS. 12 and 13, key 50 is inserted into the rear of the termination module and is rotated upwardly in the direction of arrow "C". This spreads fiber cover 34 (FIG. 3) and buffer cover 36 upwardly away from base 26 to open fiber channels 28 and buffer channels 29 in the base. Each cable 52 (52A and 52B) then can be inserted into the rear of the termination module, with the cables prepared to expose fiber ends 54a (FIG. 10). FIG. 11 shows cable 52A fully inserted into the termination module. When fully inserted, fiber end 54a of that cable will abut against the proximal end 32b (FIG. 4) of the right-hand fiber stub 32. In other words, fiber channels 28 in base 26 function to splice fiber stubs 32 to fiber ends 54a of the cables. In addition, when fully inserted, buffered sections 56 of the cables are disposed in buffer channels 29 (FIGS. 4 and 5) of base 26. When one of the cables, such as cable 52A in FIG. 11, is fully inserted into termination module 20, the fiber is pressed downwardly into its respective channel 48 in fixture 46. Retaining ribs 48a serve to hold either cable in its respective channel by a press-fit, while the other cable can be manipulated as seen in FIG. 11.

Figure 12:
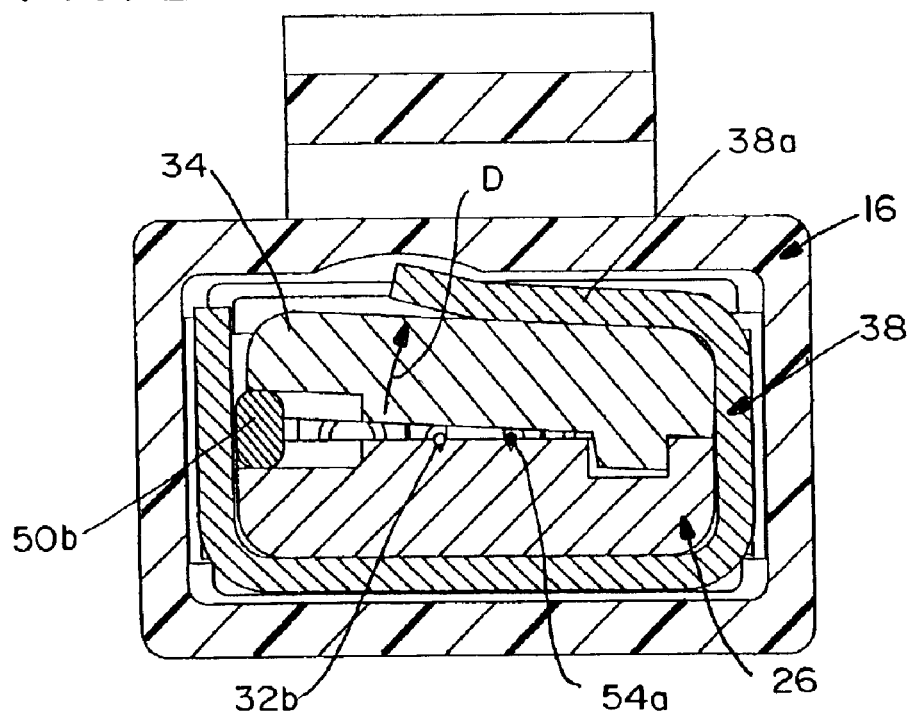
FIG. 12 is a vertical section taken generally along line 12—12 of FIG. 11.

FIG. 12 shows smaller probe portion 50b in its operative condition when key 50 is rotated to the position shown in FIG. 11. In the operative positive, the smaller probe portion is effective to spread fiber cover 34 upwardly in the direction of arrow "D" against the biasing of clamping potion 38a of metal spring sleeve 38. This allows fiber ends 54a of cables 52 to be inserted freely into abutting relationship with the rear proximal ends 32b of fiber stubs 32.

Figure 13:
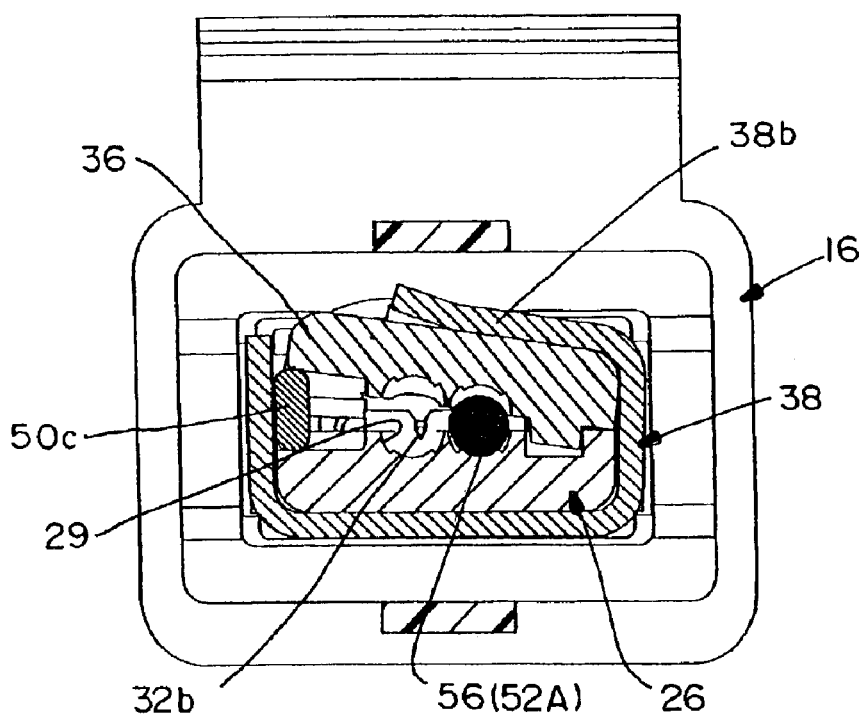
FIG. 13 is a vertical section taken generally along line 13—13 of FIG. 11.

Similarly, FIG. 13 shows larger probe portion 50c of key 50 being effective to raise buffer cover 36 away from base 26 against the biasing of clamping portion 38b of metal spring sleeve 38. This opens buffer channels 29 in the base for insertion thereinto of a full buffered section 56 of a cable. Once the cables are fully inserted, key 50 is rotated back opposite the direction of arrow "C" (FIG. 11), whereupon clamping portions 38a and 38b of metal spring sleeve 38 bias fiber cover 34 and buffer cover 36 downwardly to completely clamp the fibers and cable within termination module 20.

After the cables are terminated within termination module 20, the cables and the module and outer housing 16 are removed from termination fixture 46. When so removed, retention tube 60 (FIG. 10) is moved forwardly to embrace cable retention boss 26c of cover 26 and cable retention boss 36a of buffer cover 36 to secure the cover onto the base to preclude any movement whatsoever. Boot 58 then is moved forwardly by inserting forward section 58a of the boot into rear open end 16b of housing 16 until rear latch arms 23 of the housing snap into latch openings 58b of the boot. Connector assembly 14 now is fully assembled as shown in FIGS. 1 and 2, terminating the pair of fiber optic cables 52.

It will be understood that the invention may be embodied in other specific forms without departing from the spirit or central characteristics thereof The present examples and embodiments, therefore, are to be considered in all respects as illustrative and not restrictive, and the invention is not to be limited to the details given herein.

What is claimed is:

1. A fiber optic connector assembly, comprising:
   an outer housing having an interior cavity;
   a termination module insertable into the cavity of the outer housing comprising:
      a ferrule for terminating a distal end of at least one optical fiber stub,
      a base attached to the ferrule and including a channel for splicing a proximal end of the optical fiber stub to a fiber end of a fiber optic cable,
      a cover positionable onto the base for holding the fiber stub and fiber end in the channel,
      a clamp for holding the cover onto the base for forming the termination module into a single piece component;
   complementary interengaging latch means between the clamp and the outer housing for holding the termination module in the cavity of the housing; and
   a rotatable key having a flat side and a stepped side, the key for biasing apart the clamp cover and base.

2. The fiber optic connector assembly of claim 1 wherein said outer housing is open-ended with an open front mating end at which a mating face of the ferrule is exposed and an open rear end through which the fiber end of the fiber optic cable is positioned into the termination module.

3. The fiber optic connector assembly of claim 1 wherein said clamp comprises a spring metal sleeve embracing the base and the cover.

4. The fiber optic connector assembly of claim 3 wherein said complementary interengaging latch means include a latch arm on the spring metal sleeve engageable with a latch shoulder on the housing.

5. The fiber optic connector assembly of claim 1 wherein the channel in the base of the termination module includes a narrow forward portion for receiving the proximal end of the optical fiber stub and the fiber end of the fiber optic cable, and a wider rearward portion for receiving a buffered section of the fiber end of the fiber optic cable.

6. The fiber optic connector assembly of claim 5 wherein said cover includes a fiber cover part for covering a splicing area of the optical fiber stub and the fiber end of the fiber optic cable, and a separate buffer cover part for covering the buffered section of the fiber end of the fiber optic cable.

7. The fiber optic connector assembly of claim 6 wherein said clamp comprises a spring metal sleeve embracing both the fiber cover part and the buffer cover part.

8. The fiber optic connector assembly of claim 7 wherein said complementary interengaging latch means include a latch arm on the spring metal sleeve engageable with a latch shoulder on the housing.

9. The fiber optic connector assembly of claim 1, including a boot surrounding the fiber optic cable extending rearwardly of the housing, and complementary interengaging second latch means between the boot and the housing to hold the boot on the housing.

10. A termination module insertable into a cavity in a housing of a fiber optic connector, comprising:
- a ferrule for terminating a distal end of at least one optical fiber stub;
- a base attached to the ferrule and including a channel for splicing a proximal end of the optical fiber stub to a fiber end of a fiber optic cable, the channel including a narrow forward portion for receiving the proximal end of the optical fiber stub and fiber end of the fiber optic cable and a wider rearward portion for receiving a buffered section of the fiber end of the fiber optic cable;
- a fiber cover positionable onto the base for covering a splicing area and holding the proximal end of the optical fiber stub and the fiber end of the fiber optic cable in the narrow forward portion of the channel;
- a buffer cover positionable onto the base for holding the buffered section of the fiber end of the fiber optic cable in the wider rearward portion of the channel; and
- a spring metal sleeve embracing both the fiber cover and the buffer cover for holding the covers onto the base and for forming the termination module into a single piece component; and
- a rotatable key having a flat side and a stepped side, the key for biasing apart the clamp cover and base.

11. The termination module of claim 10 wherein said spring metal sleeve includes a latch for latchingly engaging the housing of the fiber optic connector.

12. The termination module of claim 11 wherein said latch comprises a flexible latch arm of the spring metal sleeve engageable with a latch shoulder on the housing.

13. A system for terminating a plurality of fiber ends of a fiber optic cable, comprising:
- a unitary termination module including a ferrule for terminating distal ends of a plurality of optical fiber stubs, and
- a base having a plurality of fiber channels for splicing proximal ends of the optical fiber stubs to a plurality of fiber ends of a fiber optic cable;
- a termination fixture including a body having a receptacle for positioning and holding the termination module, the body having a plurality of buffer channels in registry with said fiber channels for receiving buffered sections of the plurality of fiber ends of the fiber optic cable, each buffer channel including retaining means for holding the respective buffered section in the buffer channel; and
- a rotatable key having a flat side and a stepped side, the key for biasing apart the clamp cover and base.

14. The system of claim 13 wherein said retaining means comprise a reduced-dimensioned cross-sectional section of the respective buffer channel for retaining the respective buffered section by a press-fit.

* * * * *